United States Patent
Naruke et al.

(10) Patent No.: US 12,347,881 B2
(45) Date of Patent: Jul. 1, 2025

(54) BATTERY-MODULE PROTECTION STRUCTURE

(71) Applicant: SUBARU CORPORATION, Tokyo (JP)

(72) Inventors: Toshiaki Naruke, Tokyo (JP); Toshiyuki Hara, Tokyo (JP); Norio Suzuki, Tokyo (JP); Yutaka Sakakura, Tokyo (JP); Kazuki Sakai, Tokyo (JP); Tatsuya Ishikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 451 days.

(21) Appl. No.: 17/971,799

(22) Filed: Oct. 24, 2022

(65) Prior Publication Data

US 2023/0137848 A1    May 4, 2023

(30) Foreign Application Priority Data

Nov. 1, 2021  (JP) ................................. 2021-178600

(51) Int. Cl.
*H01M 50/242* (2021.01)
*B60K 1/04* (2019.01)
(Continued)

(52) U.S. Cl.
CPC ............ *H01M 50/242* (2021.01); *B60K 1/04* (2013.01); *H01M 50/249* (2021.01); *H01M 50/264* (2021.01); *B60K 2001/0438* (2013.01)

(58) Field of Classification Search
CPC ............ H01M 50/242; H01M 50/249; H01M 50/264; H01M 50/204; H01M 2220/20; H01M 50/244; B60K 1/04; B60K 2001/0438; B60K 2001/0405; B60Y 2306/01

See application file for complete search history.

(56) References Cited

U.S. PATENT DOCUMENTS

| 6,386,611 B1 * | 5/2002 | Buchfink | ................ B60R 11/02 |
| | | | 296/37.16 |
| 8,037,960 B2 * | 10/2011 | Kiya | .................... H01M 50/249 |
| | | | 180/68.5 |

(Continued)

FOREIGN PATENT DOCUMENTS

| CN | 111232060 A | * | 6/2020 | ............. B60H 1/246 |
| CN | 113561777 A | * | 10/2021 | ............... B60K 1/04 |

(Continued)

*Primary Examiner* — James A Shriver, II
*Assistant Examiner* — Ian Bryce Shelton
(74) *Attorney, Agent, or Firm* — MCGINN I.P. LAW GROUP, PLLC (57) ABSTRACT

A battery-module protection structure is configured to protect a battery module accommodated within a vehicle frame of a vehicle from an external impact. The battery-module protection structure includes a rail disposed within the vehicle frame, a pedestal securing the battery module and secured to the rail by using a securing member, and the vehicle frame serving as a housing of the battery module. The pedestal is configured such that, in a case where the vehicle receives the external impact and the securing member breaks, the pedestal moves in an inner direction of the vehicle along the rail while securing the battery module.

10 Claims, 11 Drawing Sheets

(51) Int. Cl.
*H01M 50/249* (2021.01)
*H01M 50/264* (2021.01)

(56) References Cited

U.S. PATENT DOCUMENTS

| | | | | |
|---|---|---|---|---|
| 8,839,895 | B2* | 9/2014 | Kato | H01M 50/242 |
| | | | | 180/68.5 |
| 9,096,117 | B2* | 8/2015 | Matsuda | B60K 6/48 |
| 9,837,645 | B2* | 12/2017 | Katayama | H01M 50/296 |
| 10,266,045 | B2* | 4/2019 | Goettfried | B62D 21/157 |
| 10,272,949 | B2* | 4/2019 | Faruque | B60K 1/04 |
| 10,442,473 | B2* | 10/2019 | Erlacher | H01M 50/262 |
| 10,483,601 | B2* | 11/2019 | Murata | H01M 10/6571 |
| 10,559,793 | B2* | 2/2020 | Smith | H01M 10/6554 |
| 10,632,847 | B2* | 4/2020 | Yokoyama | B60L 50/66 |
| 10,727,549 | B2* | 7/2020 | Omura | B60L 50/64 |
| 11,097,787 | B2* | 8/2021 | Ebisumoto | B62D 25/20 |
| 11,152,665 | B2* | 10/2021 | Shimada | B60L 50/50 |
| 11,420,509 | B2* | 8/2022 | Saeki | B60R 22/26 |
| 11,955,617 | B2* | 4/2024 | Kaneshima | H01M 10/625 |
| 2009/0226806 | A1* | 9/2009 | Kiya | B60R 16/04 |
| | | | | 429/186 |
| 2009/0239136 | A1* | 9/2009 | Nagamine | H01M 10/0481 |
| | | | | 429/148 |
| 2013/0075173 | A1* | 3/2013 | Kato | H01M 50/242 |
| | | | | 180/68.5 |
| 2013/0133961 | A1* | 5/2013 | Matsuda | B60K 1/04 |
| | | | | 903/951 |
| 2016/0190526 | A1* | 6/2016 | Yamada | H01M 50/264 |
| | | | | 180/68.5 |
| 2016/0248059 | A1* | 8/2016 | Katayama | B60K 1/04 |
| 2017/0203668 | A1* | 7/2017 | Enning | B60L 50/64 |
| 2018/0138559 | A1* | 5/2018 | Omura | B60L 50/66 |
| 2019/0181398 | A1* | 6/2019 | Shimada | B60L 50/64 |
| 2019/0355948 | A1* | 11/2019 | Smith | H01M 10/625 |
| 2021/0146763 | A1* | 5/2021 | Shin | B60L 50/66 |
| 2021/0273275 | A1* | 9/2021 | Takahashi | H01M 10/613 |
| 2022/0037718 | A1* | 2/2022 | Kaneshima | H01M 50/291 |
| 2022/0037726 | A1* | 2/2022 | Choi | H01M 10/6556 |
| 2023/0395926 | A1* | 12/2023 | Zhang | H01M 50/238 |

FOREIGN PATENT DOCUMENTS

| | | | | |
|---|---|---|---|---|
| DE | 102019117105 A1 * | 2/2020 | | B60K 1/04 |
| JP | 2004243882 A * | 9/2004 | | |
| JP | 2017196961 A * | 11/2017 | | |

* cited by examiner

BATTERY-MODULE PROTECTION STRUCTURE

CROSS-REFERENCE TO RELATED APPLICATIONS

The present application claims priority from Japanese Patent Application No. 2021-178600 filed on Nov. 1, 2021, the entire contents of which are hereby incorporated by reference.

BACKGROUND

The disclosure relates to battery-module protection structures that protect battery modules accommodated within vehicle frames of vehicles.

A known battery-module protection structure in the related art is described in, for example, Japanese Unexamined Patent Application Publication (JP-A) No. 2004-243882.

A battery pack is installed on the upper surface of the vehicle floor behind the rear seat. A battery protection cover is fastened to a right wheel house and a left wheel house by using bolts such that the battery protection cover accommodates battery modules. According to this structure, the battery protection cover is used as a housing for the battery pack as well as a rear cross member.

SUMMARY

An aspect of the disclosure provides a battery-module protection structure configured to protect a battery module accommodated within a vehicle frame of a vehicle from an external impact. The battery-module protection structure includes a rail disposed within the vehicle frame, a pedestal securing the battery module and secured to the rail by using a securing member, and the vehicle frame serving as a housing of the battery module. The pedestal is configured such that, in a case where the vehicle receives the external impact and the securing member breaks, the pedestal moves in an inner direction of the vehicle along the rail while securing the battery module.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

In the battery-module protection structure disclosed in JP-A No. 2004-243882, the battery protection cover has a predetermined bonding strength or higher, and is fastened to the right wheel house and the left wheel house by using bolts.

On the other hand, although JP-A No. 2004-243882 discloses that the battery pack is installed on the vehicle floor, JP-A No. 2004-243882 does not disclose a specific method for securing the battery pack to the vehicle floor. However, from referring to the drawings, it is assumable that the battery pack is secured to the vehicle floor.

For example, when the vehicle is involved in a lateral collision, the wheel houses and the battery protection cover may sometimes become deformed toward the interior of the vehicle. If the battery pack collides with the deformed wheel houses, since the battery pack is secured to the vehicle floor, it is difficult to relieve the impact occurring during the collision. As a result, it is problematic in that the battery pack may possibly become damaged, and adjacent battery cells in the battery pack may possibly become damaged as a result of the battery cells colliding with each other.

It is desirable to provide a battery-module protection structure that protects a battery module accommodated within a vehicle frame of a vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A protection structure 11 for a battery module 10 according to the embodiment of the disclosure will be described in detail below with reference to the drawings. In each drawing, the front-rear direction indicates the front-rear direction of a vehicle 12, the left-right direction indicates the vehicle-width direction of the vehicle 12, and the up-down direction indicates the height direction of the vehicle 12.

Figure 1:
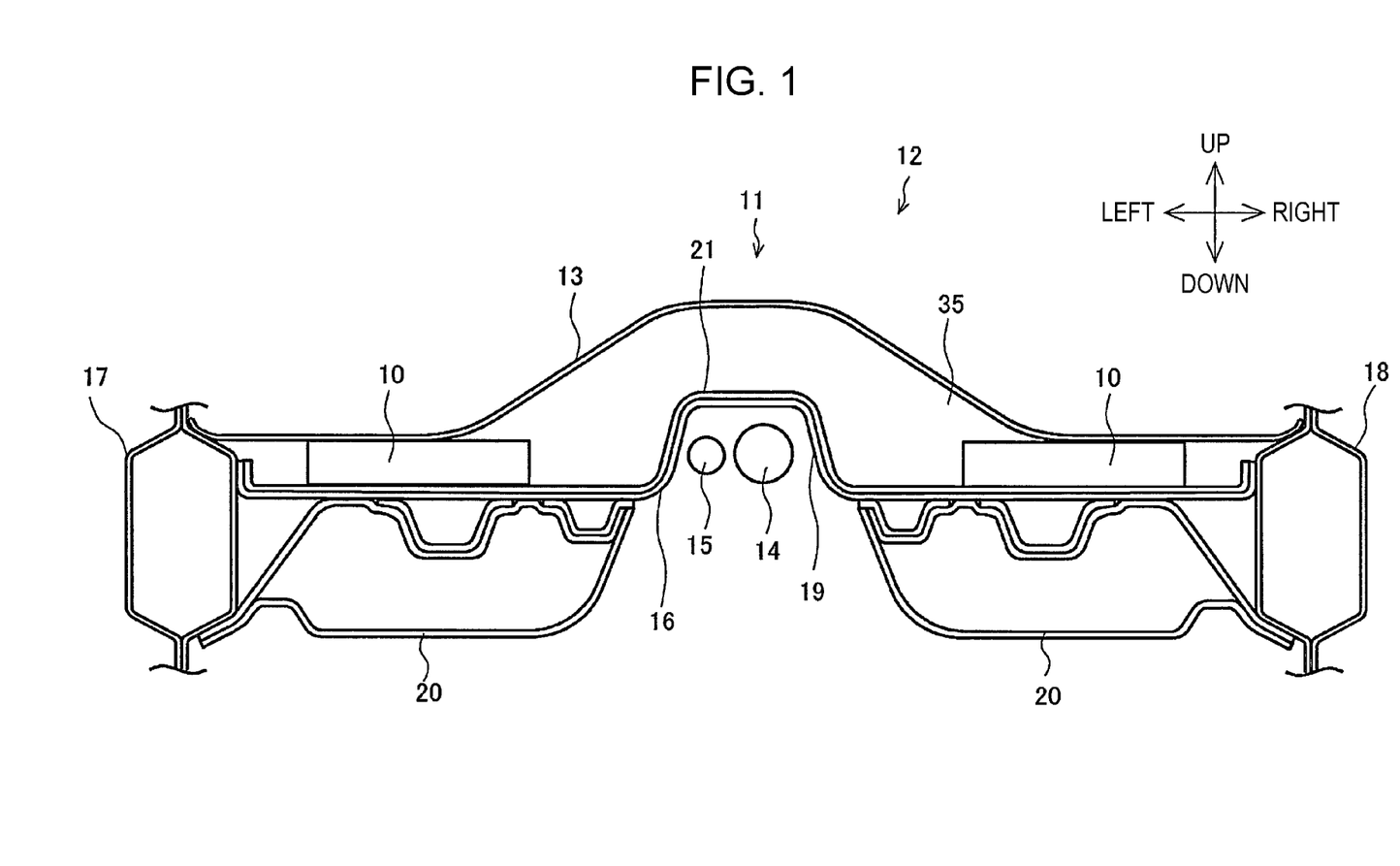
FIG. 1 schematically illustrates a vehicle equipped with a battery-module protection structure according to an embodiment of the disclosure.
Figure 2:
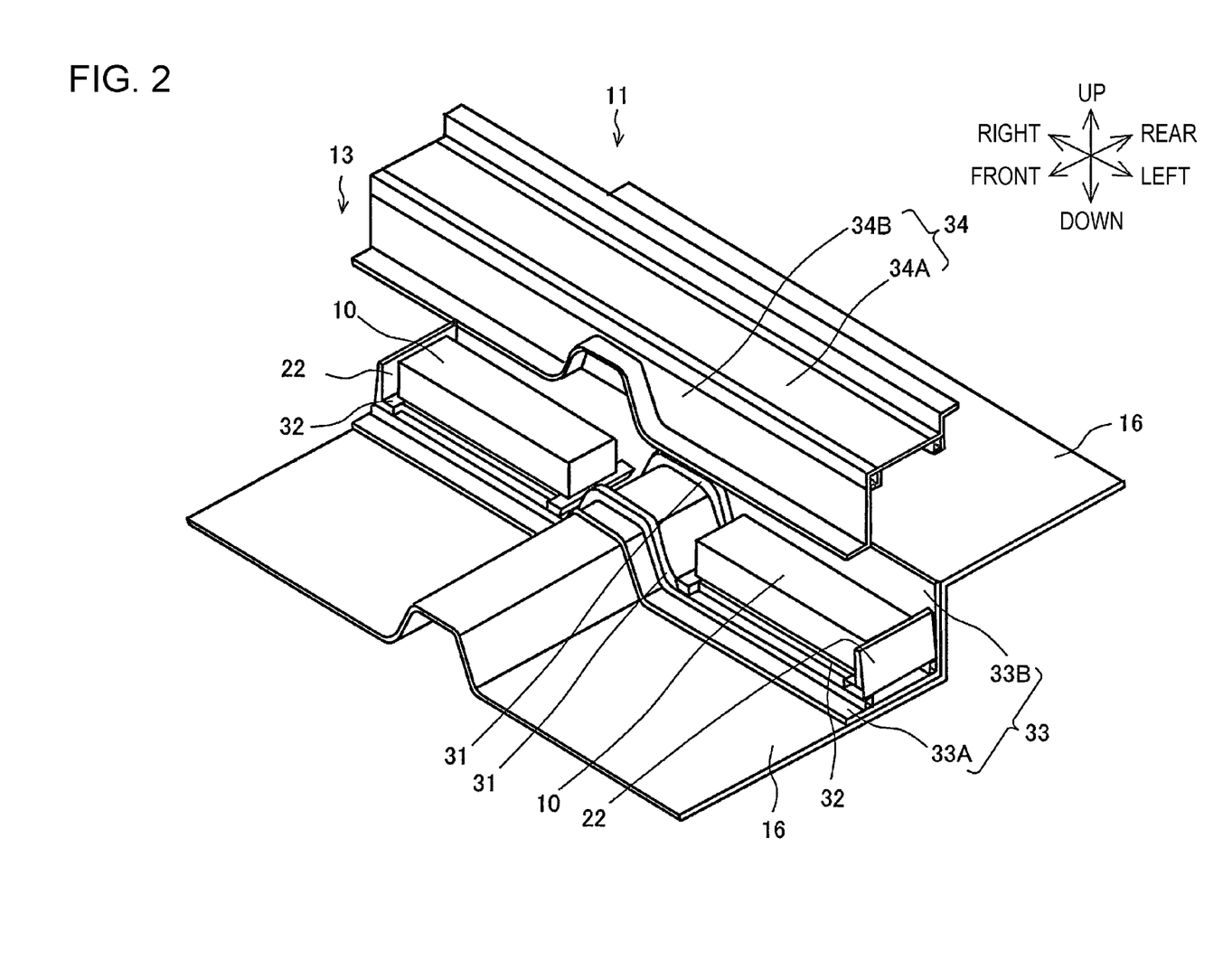
FIG. 2 is an exploded perspective view illustrating the battery-module protection structure according to the embodiment of the disclosure.
Figure 3A:
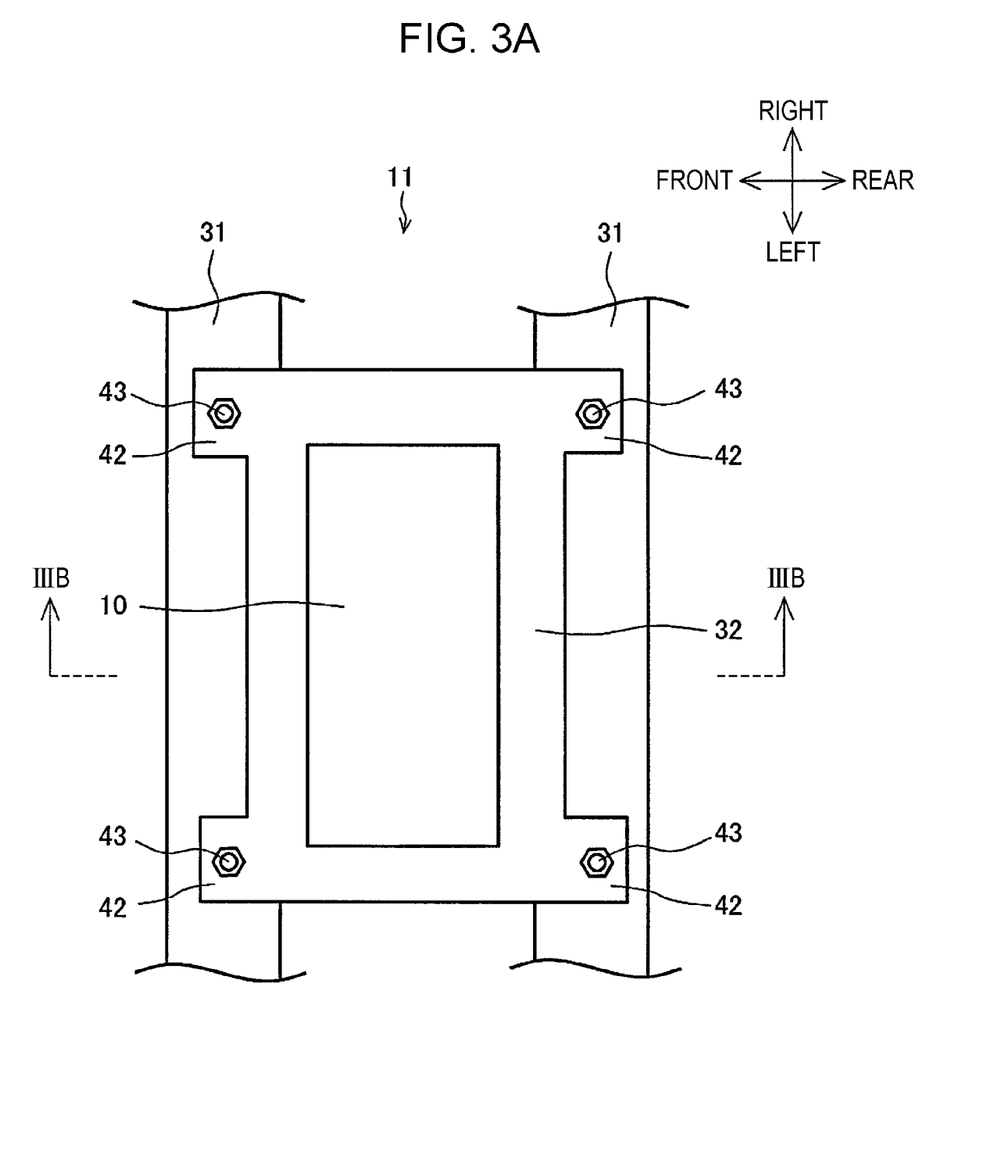
FIG. 3A is a top view illustrating the battery-module protection structure according to the embodiment of the disclosure.
Figure 3B:
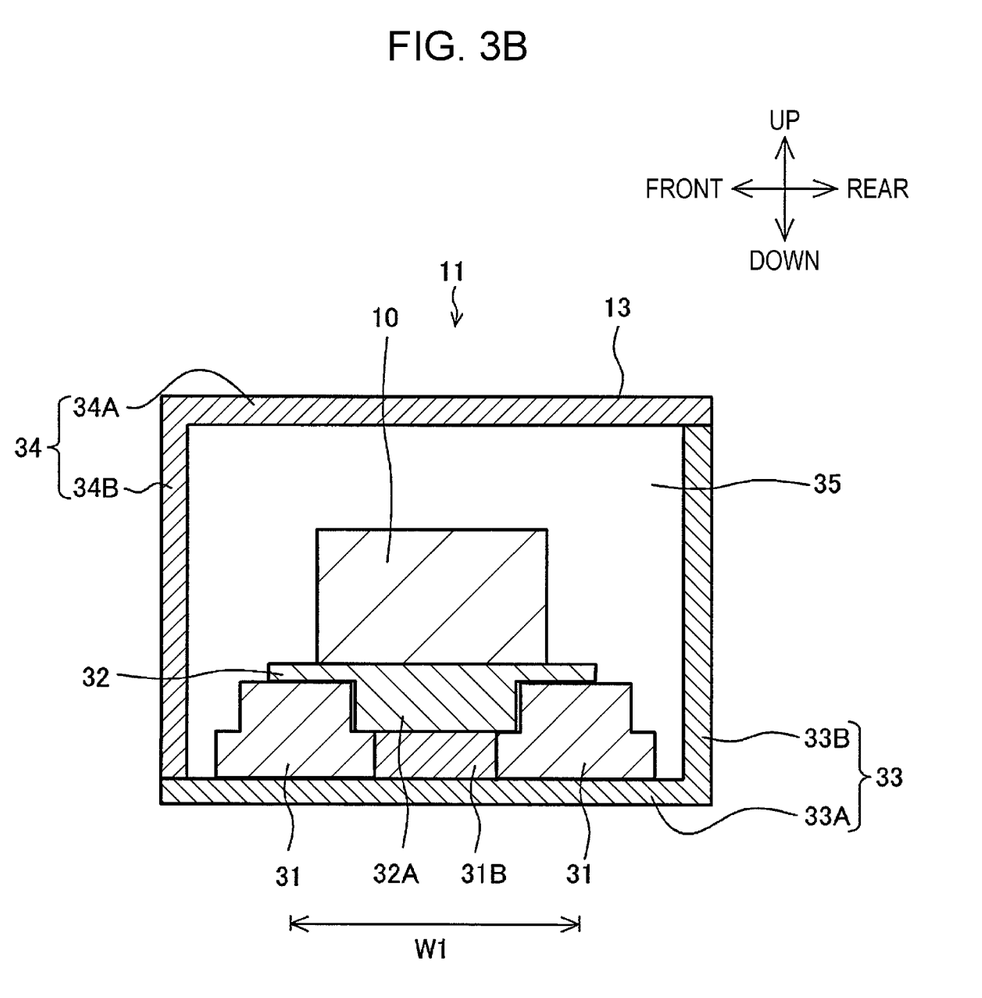
FIG. 3B is a cross-sectional view illustrating the battery-module protection structure according to the embodiment of the disclosure.

FIG. 1 schematically illustrates the protection structure 11 for the battery module 10 according to this embodiment. FIG. 2 is an exploded perspective view illustrating the protection structure 11 for the battery module 10 according to this embodiment. FIG. 3A is a top view illustrating the protection structure 11 for the battery module 10 according to this embodiment. FIG. 3B is a cross-sectional view illustrating the protection structure 11 for the battery module 10 according to this embodiment. In FIG. 1, a rail 31 and a pedestal 32 are omitted for illustrative purposes. In FIG. 3A, a cross member 13 is omitted for illustrative purposes.

As illustrated in FIG. 1, in the vehicle 12, such as an automobile or an electric train, the battery module 10 is installed for supplying electric power to a motor and various electrical components. Examples of an automobile serving as the vehicle 12 include an electrical vehicle (EV), a hybrid electrical vehicle (HEV), and a plug-in hybrid electrical vehicle (PHEV), all of which are becoming popular in recent years.

In this embodiment, for example, the battery module 10 is accommodated within the cross member 13 serving as a vehicle frame below the rear seat of the vehicle 12. As illustrated in FIG. 1, the cross member 13 is a hollow structure and is disposed on the upper surface of a floor panel 16. The cross member 13 extends in the vehicle-width direction of the vehicle 12 and has opposite sides respectively joined to side sills 17 and 18.

The floor panel 16 is disposed to cover the upper side of a propeller shaft 14, an exhaust pipe 15, and an under cover 20. The center of the floor panel 16 in the vehicle-width direction is provided with a tunnel 19 extending in the front-rear direction of the vehicle 12. The propeller shaft 14 and the exhaust pipe 15 are disposed in the tunnel 19. The tunnel 19 in the floor panel 16 serves as a protrusion region protruding upward into the vehicle 12.

With this structure, the center of the cross member 13 is provided with a protrusion region 21 that conforms to the shape of the floor panel 16. The battery module 10 is accommodated within the cross member 13 at each of the opposite sides of the protrusion region 21 in the vehicle-width direction. Although details will be provided later, the cross member 13 also serves as a housing for the battery module 10. Since a battery casing in the related art is not used for the battery module 10, the manufacturing cost of the battery module 10 is reduced, and the total weight of the battery module 10 is reduced.

As illustrated in FIG. 2, the protection structure 11 for the battery module 10 mainly includes the cross member 13 used as a housing for the battery module 10, the floor panel 16 that supports the cross member 13 from below, the rail 31 disposed within the cross member 13, the pedestal (base) 32 engaged with and secured to the rail 31, and the battery module 10 secured to the upper surface of the pedestal 32.

The cross member 13 is disposed in the vehicle-width direction of the vehicle 12 and includes, for example, a lower cross member 33 and an upper cross member 34. The lower cross member 33 includes, for example, a bottom plate 33A and a rear plate 33B, and is substantially L-shaped in cross section. The upper cross member 34 includes, for example, a top plate 34A and a front plate 34B, and is substantially L-shaped in cross section.

The bottom plate 33A of the lower cross member 33 conforms to the shape of the floor panel 16, and the lower cross member 33 is disposed on the upper surface of the floor panel 16. The upper cross member 34 is fixed to the lower cross member 33 by welding. A cavity 35 (see FIG. 1) that is substantially rectangular in cross section is provided within the cross member 13.

The rail 31 extends in the vehicle-width direction of the vehicle 12 and is secured on the bottom plate 33A of the lower cross member 33. During the normal traveling mode of the vehicle 12, the rail 31 supports the pedestal 32 in a secured state. When the vehicle 12 is involved in a lateral collision and the pedestal 32 detaches from the rail 31 due to a large external impact applied to the pedestal 32, the rail 31 guides the traveling of the pedestal 32.

In a state where the lower surface of the pedestal 32 is partially engaged with the rail 31, the pedestal 32 is secured to the upper surface of the rail 31. The pedestal 32 is also used as a placement plate for the battery module 10 by having the battery module 10 secured on the upper surface on the pedestal 32.

Protection walls 22 located away from the ends of the battery module 10 are provided near the ends of the pedestal 32 at the outer sides of the vehicle cabin. Although details will be provided later, when the vehicle 12 is involved in a lateral collision, the protection walls 22 deform and receive the side sills 17 and 18 entering the vehicle 12, so as to prevent the side sills 17 and 18 from colliding with the battery module 10.

The battery module 10 is disposed on the upper surface of the pedestal 32 and has battery cells (not illustrated) coupled to each other in series via a bus bar (not illustrated). Each battery cell is, for example, a secondary cell, such as a nickel-hydrogen cell or a lithium-ion cell. For example, the battery cells each have a shape of a rectangular flat plate and are disposed in the extending direction (i.e., the left-right direction of the drawing) of the rail 31 while being evenly spaced apart from each other with a small cooling gap therebetween. The battery module 10 is electrically coupled to a BCU (not illustrated) serving as an electronic device and to a junction box (not illustrated).

As illustrated in FIG. 3A, the pedestal 32 is substantially rectangular in top view. The pedestal 32 is also used as a placement plate for the battery module 10 and has a tabular body larger than the battery module 10. The four corners of the pedestal 32 individually have securing regions 42. The securing regions 42 are used as regions for securing the pedestal 32 to the rail 31 by using bolts.

The rail 31 has four threaded holes (not illustrated) at the securing locations of the four securing regions 42. The securing regions 42 have holes (not illustrated) for receiving and supporting bolts 43. The pedestal 32 is disposed on the upper surface of the rail 31 in a state where the threaded holes and the holes are positioned with respect to each other, and is secured to the rail 31 by using the bolts 43 serving as securing members.

Although details will be provided later, for example, when a large external impact is applied to the pedestal 32 due to the vehicle 12 being involved in a lateral collision, the pedestal 32 moves toward the interior (in an inner direction) of the vehicle 12 together with the battery module 10. In this case, the four bolts 43 break near the boundary regions between the rail 31 and the securing regions 42, so that the pedestal 32 detaches from the rail 31.

FIG. 3B is a cross-sectional view of the protection structure 11 for the battery module 10, taken along line IIIB-IIIB in FIG. 3A. As illustrated in FIG. 3B, the rail 31 extends in the vehicle-width direction and has a predetermined width W1. The rail 31 has, for example, a substantially protruding shape in cross section. The rail 31 has a receiver recess 31B to be engaged with an engagement protrusion 32A of the pedestal 32.

With this structure, the engagement protrusion 32A of the pedestal 32 engages with the receiver recess 31B of the rail 31, and the lower surface of the pedestal 32 abuts on the upper surface of the rail 31. As mentioned above, the pedestal 32 is secured to the rail 31 by using the bolts 43, and the engagement protrusion 32A is engaged with the receiver recess 31B, so that the pedestal 32 is stably secured to the upper surface of the rail 31.

As mentioned above, the cavity 35 that is substantially rectangular in cross section is provided within the cross member 13. The battery module 10 utilizes the cavity 35 in the cross member 13 so as to be accommodated in the cavity 35. The battery module 10 is disposed at a position located away from the bottom plate 33A and the rear plate 33B of the lower cross member 33 and from the top plate 34A and the front plate 34B of the upper cross member 34.

With this structure, although the entire vehicle 12 including the cross member 13 shakes due to vibrations occurring when the vehicle 12 is traveling, the battery module 10 is prevented from colliding with the cross member 13. Moreover, the battery module 10 is surrounded and covered by the cross member 13, so as to be prevented from colliding with other components of the vehicle 12.

In other words, in this embodiment, the cross member 13 is used as a housing for the battery module 10. Since a housing serving as a battery casing in the related art is not used for the battery module 10, the manufacturing cost of the battery module 10 is reduced, and the total weight of the battery module 10 is reduced.

Figure 4A:
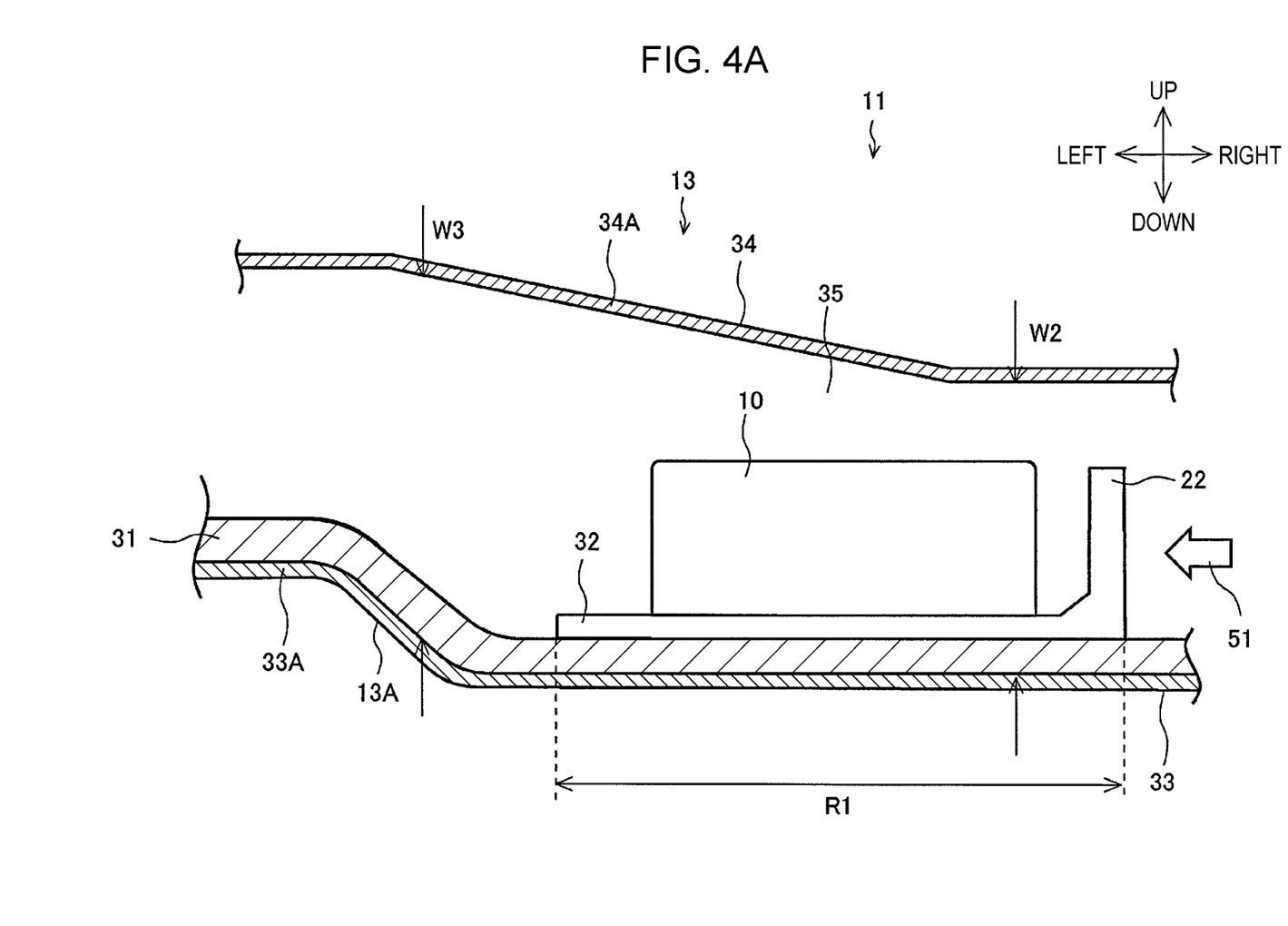
FIG. 4A is a cross-sectional view illustrating the battery-module protection structure according to the embodiment of the disclosure.
Figure 4B:
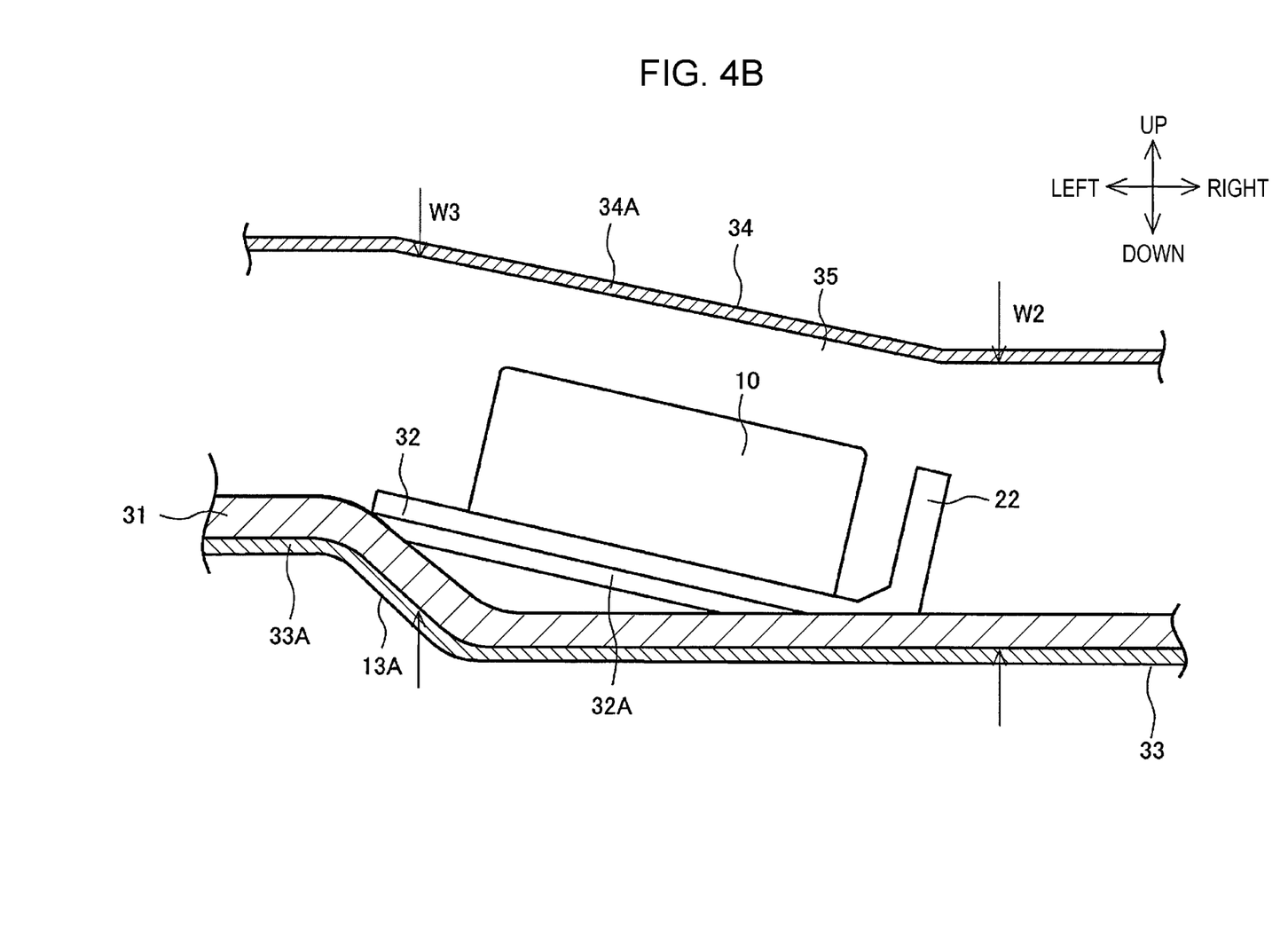
FIG. 4B is a cross-sectional view illustrating the battery-module protection structure according to the embodiment of the disclosure.
Figure 5:
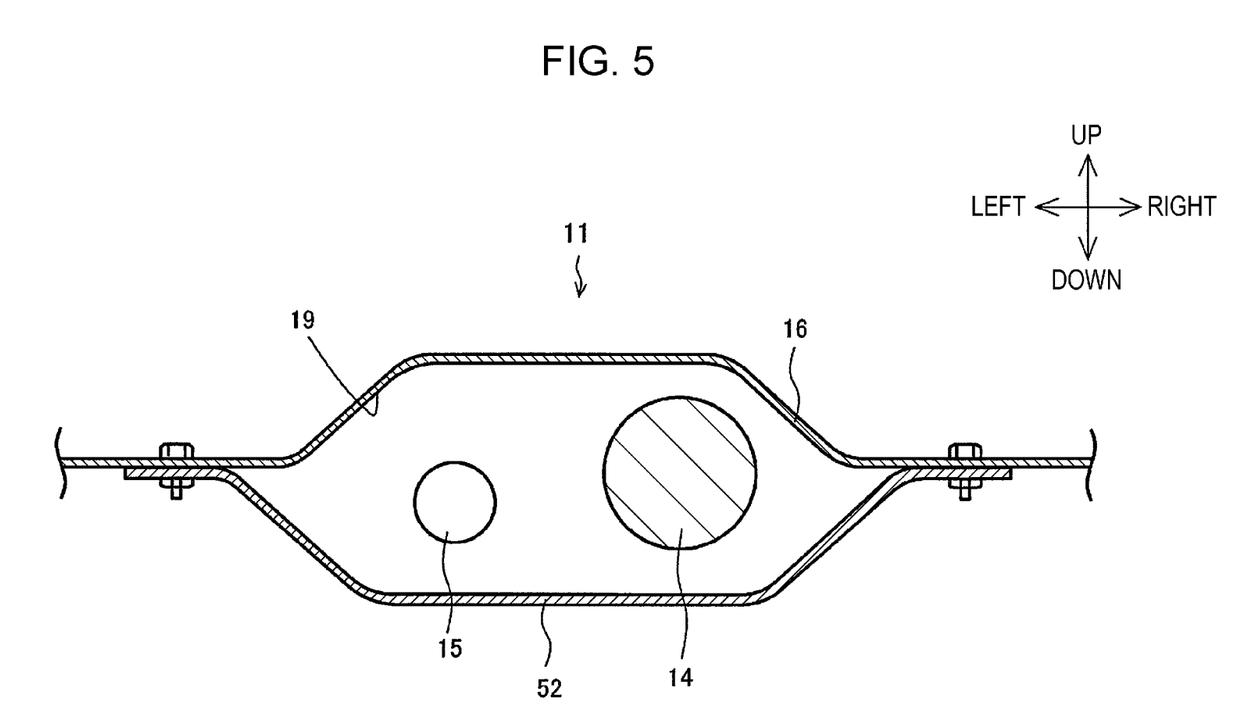
FIG. 5 is a cross-sectional view illustrating the battery-module protection structure according to the embodiment of the disclosure.

The protection structure 11 for the battery module 10 when the vehicle 12 receives an external impact will now be described in detail with reference to FIG. 4A to FIG. 5. FIG. 4A is a cross-sectional view illustrating the protection structure 11 for the battery module 10 before the vehicle 12 according to this embodiment receives an external impact. FIG. 4B is a cross-sectional view illustrating the protection structure 11 for the battery module 10 after the vehicle 12 according to this embodiment receives an external impact. FIG. 5 is a cross-sectional view illustrating the protection structure 11 for the battery module 10 according to this embodiment. Although the following description relates to a case where an external impact is applied due to a lateral collision from the right side of the vehicle 12, the same applies to a case where an external impact is applied due to a lateral collision from the left side of the vehicle 12, and a description of such a case will thus be omitted.

An external impact in this embodiment is, for example, an external input force applied to the vehicle 12 when the vehicle 12 is involved in a lateral collision. An external impact is not limited to such an external input force occurring due to a lateral collision. An example of an external impact includes an external input force applied when the vehicle 12 rolls over due to a collision accident and the side sills 17 and 18 become deformed toward the interior (in an inner direction) of the vehicle 12.

As illustrated in FIG. 4A, with regard to the cross member 13, the lower cross member 33 and the upper cross member 34 are joined to each other by welding. The cross member 13 is a hollow structure having the cavity 35. The rail 31 extends in the vehicle-width direction of the vehicle 12 and is secured on the bottom plate 33A of the lower cross member 33. The pedestal 32 is secured to the rail 31 and supports the battery module 10 in a secured state on the upper surface thereof.

As illustrated in FIG. 4A, the top plate 34A of the upper cross member 34 extends in a substantially horizontal state from the side sill 18 (see FIG. 1) to a securing region R1 of the pedestal 32. The top plate 34A is then inclined diagonally upward from the securing region R1 of the pedestal 32 toward the center of the vehicle 12. In this embodiment, the top plate 34A is inclined diagonally upward at least to a location above a bent segment 13A of the cross member 13 such that a sufficient space can be ensured above the bent segment 13A.

According to this structure, with regard to the width of the cavity 35 in the height direction of the vehicle 12, a width W3 at the bent segment 13A of the cross member 13 is larger than a width W2 at the securing region R1 of the pedestal 32. In the securing region R1 of the pedestal 32, a sufficient space is also ensured above the battery module 10.

FIG. 4A illustrates a state where a large external impact is not applied to the pedestal 32 during the normal traveling mode of the vehicle 12. In this state, even if vibrations occurring during the traveling of the vehicle 12 are applied to the pedestal 32, the pedestal 32 is maintained in the secured state on the upper surface of the rail 31 by using the bolts 43 (see FIG. 3A). With the sufficient space ensured between the battery module 10 and the cross member 13, the battery module 10 is prevented from colliding with the cross member 13, so that the battery cells are prevented from being damaged. Furthermore, the battery module 10 is maintained in the secured state on the upper surface of the pedestal 32, so that the battery cells are prevented from being deformed and damaged as a result of colliding with each other due to vibrations occurring during the traveling of the vehicle 12.

As illustrated in FIG. 4B, when the vehicle 12 is involved in a lateral collision and the side sill 18 (see FIG. 1) becomes deformed toward the interior (in the inner direction) of the vehicle 12, the side sill 18 collides with the corresponding protection wall 22 of the pedestal 32, so that an external impact indicated by an arrow 51 (see FIG. 4A) is applied to the pedestal 32. Then, the external impact is applied to the four bolts 43 (see FIG. 3A) via the pedestal 32. If the external impact is greater than the design strength of the bolts 43, the four bolts 43 break, as mentioned above. As a result, the pedestal 32 detaches from the rail 31, and the pedestal 32 moves toward the interior (in an inner direction) of the vehicle 12 via the rail 31.

As mentioned above, the width W3 of the cavity 35 at the bent segment 13A of the lower cross member 33 is larger than the width W2 of the cavity 35 at the securing region R1 of the pedestal 32. After the pedestal 32 that has moved toward the center of the vehicle 12 collides with the rail 31 located at the bent segment 13A of the cross member 13, the leading end of the pedestal 32 is lifted upward along the rail 31 disposed in an inclined fashion.

As illustrated in FIG. 4B, the cavity 35 at the bent segment 13A has the larger width W3 so that the upper surface of the battery module 10 moving together with the pedestal 32 is prevented from colliding with the top plate 34A of the upper cross member 34. In this case, the engagement protrusion 32A at the leading end of the pedestal 32 disengages from the receiver recess 31B (see FIG. 3B) of the rail 31, whereas the engagement protrusion 32A at the trailing end of the pedestal 32 is maintained in the engaged state with the receiver recess 31B.

With this structure, the pedestal 32 moves in an inner direction of the vehicle 12 while being guided by the rail 31. As a result, the battery module 10 on the upper surface of the pedestal 32 is prevented from colliding with the top plate 34A, the front plate 34B, and the rear plate 33B of the cross member 13, and the battery cells are prevented from being damaged. Furthermore, the battery module 10 is maintained in the secured state on the upper surface of the pedestal 32, so that the battery cells are prevented from being deformed and damaged as a result of colliding with each other.

Furthermore, the protection walls 22 located away from end plates (not illustrated) of the battery module 10 are provided near the ends of the pedestal 32 at the outer sides of the vehicle cabin. The protection walls 22 are larger than the end plates of the battery module 10. Each protection wall 22 is located between the corresponding end plate of the battery module 10 and the side sill 18.

With this structure, when the vehicle 12 is involved in a lateral collision and the side sill 18 becomes deformed toward the interior (in an inner direction) of the vehicle 12, the side sill 18 collides with the protection wall 22 so that the side sill 18 is less likely to collide with the battery module 10. On the other hand, the protection wall 22 receives the aforementioned external impact, and the pedestal 32 transmits the external impact to the bolts 43. If the external impact exceeds the design strength of the bolts 43, the pedestal 32 detaches from the rail 31 by breaking the bolts 43. As a result, as mentioned above, the pedestal 32 moves toward the center of the vehicle 12, so that the battery module 10 is prevented from colliding with the deformed side sill 18 and the protection wall 22, whereby the battery module 10 is prevented from being damaged.

The pedestal 32 is not limited to the case where the pedestal 32 is provided with the protection walls 22. As mentioned above, the battery module 10 is secured to the position located inwardly away from each end of the pedestal 32. Therefore, even in a structure where the pedestal 32 is not provided with the protection walls 22, the deformed side sill 18 collides with the corresponding end of the pedestal 32, so that effects similar to the structure having the protection walls 22 are achieved. However, with the pedestal 32 having the protection walls 22, the battery module 10 is less likely to be damaged, as compared with the structure not having the protection walls 22.

As illustrated in FIG. 5, a reinforcement member 52 may be disposed for the tunnel 19 in the floor panel 16 such that the reinforcement member 52 reinforces the floor panel 16 at least in the region where the rail 31 is disposed. The reinforcement member 52 is composed of the same material as the floor panel 16 and is secured to the floor panel 16 by using, for example, bolts. In the tunnel 19, the propeller shaft 14 and the exhaust pipe 15 are disposed between the reinforcement member 52 and the floor panel 16.

As mentioned above with reference to FIG. 4B, when the aforementioned external impact is applied to the vehicle 12 and the pedestal 32 detaches from the rail 31, the leading end of the pedestal 32 collides with the rail 31 at the bent segment 13A of the lower cross member 33. In this case, although a large impact force is also applied to the floor panel 16, the reinforcement member 52 prevents the tunnel 19 from collapsing as a result of the floor panel 16 deforming in the opening direction. As a result, the propeller shaft 14 and the exhaust pipe 15 are prevented from being damaged as a result of the floor panel 16 colliding with the propeller shaft 14 and the exhaust pipe 15.

Figure 6A:
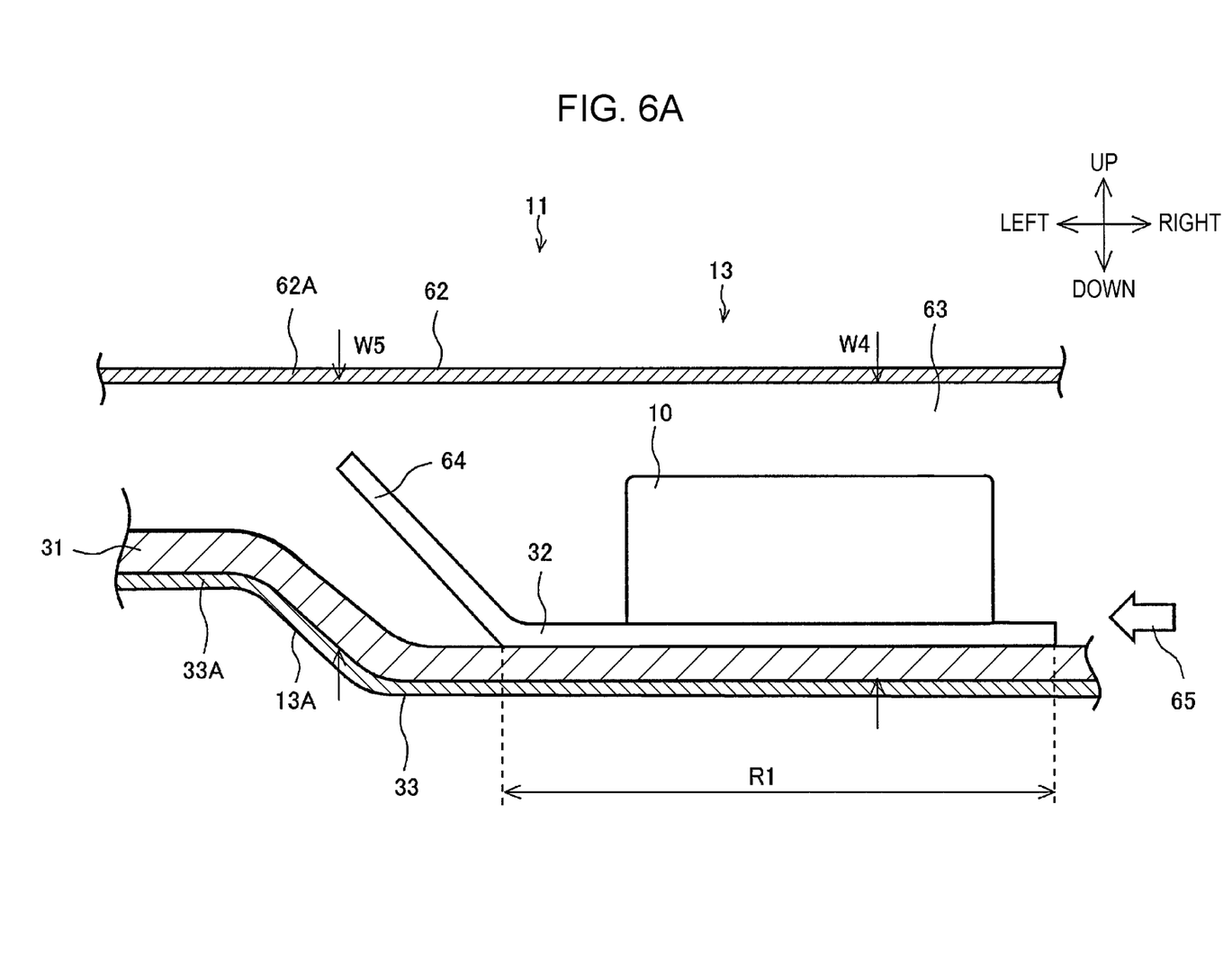
FIG. 6A is a cross-sectional view illustrating a first modification of the battery-module protection structure according to the embodiment of the disclosure.
Figure 6B:
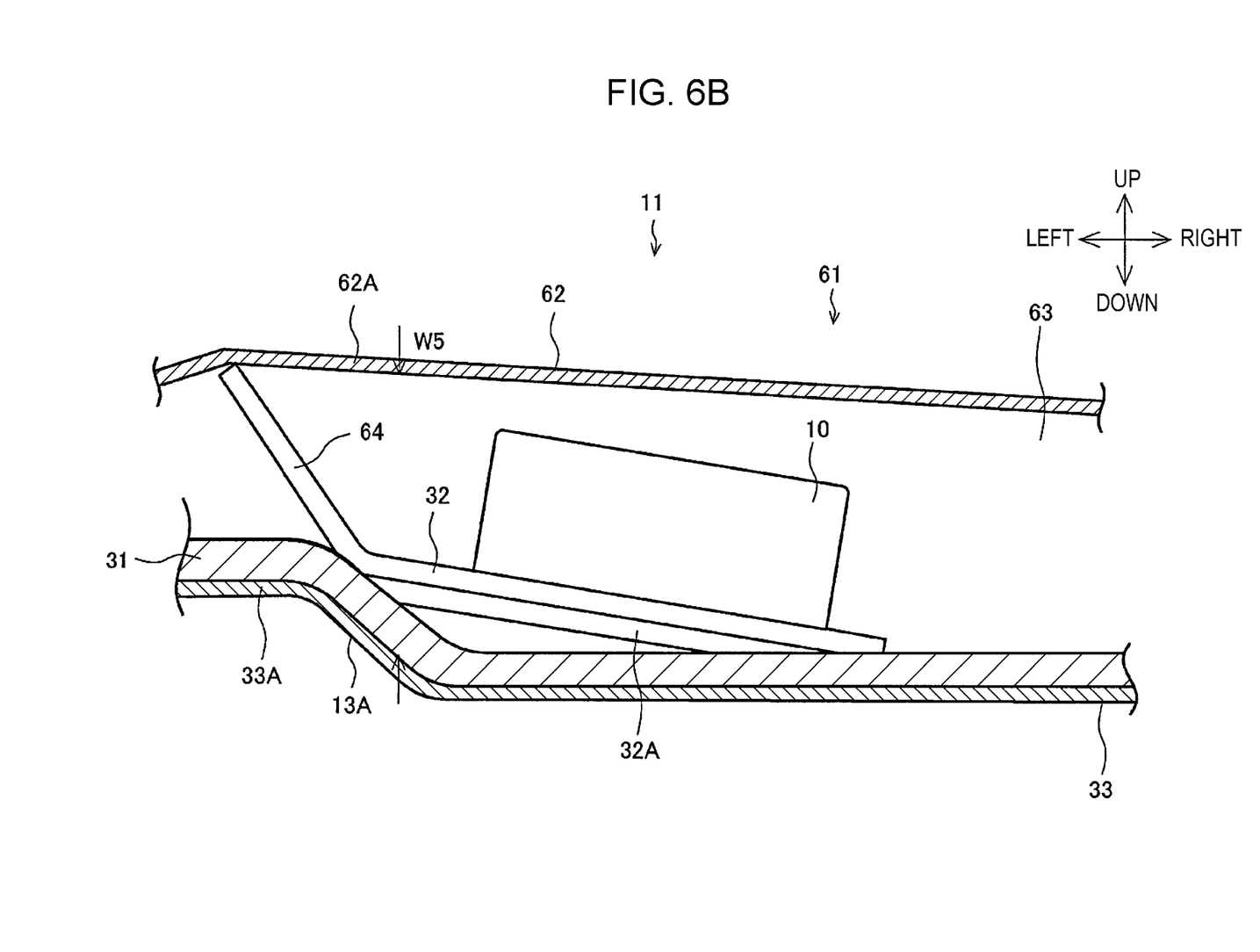
FIG. 6B is a cross-sectional view illustrating the first modification of the battery-module protection structure according to the embodiment of the disclosure.
Figure 7A:
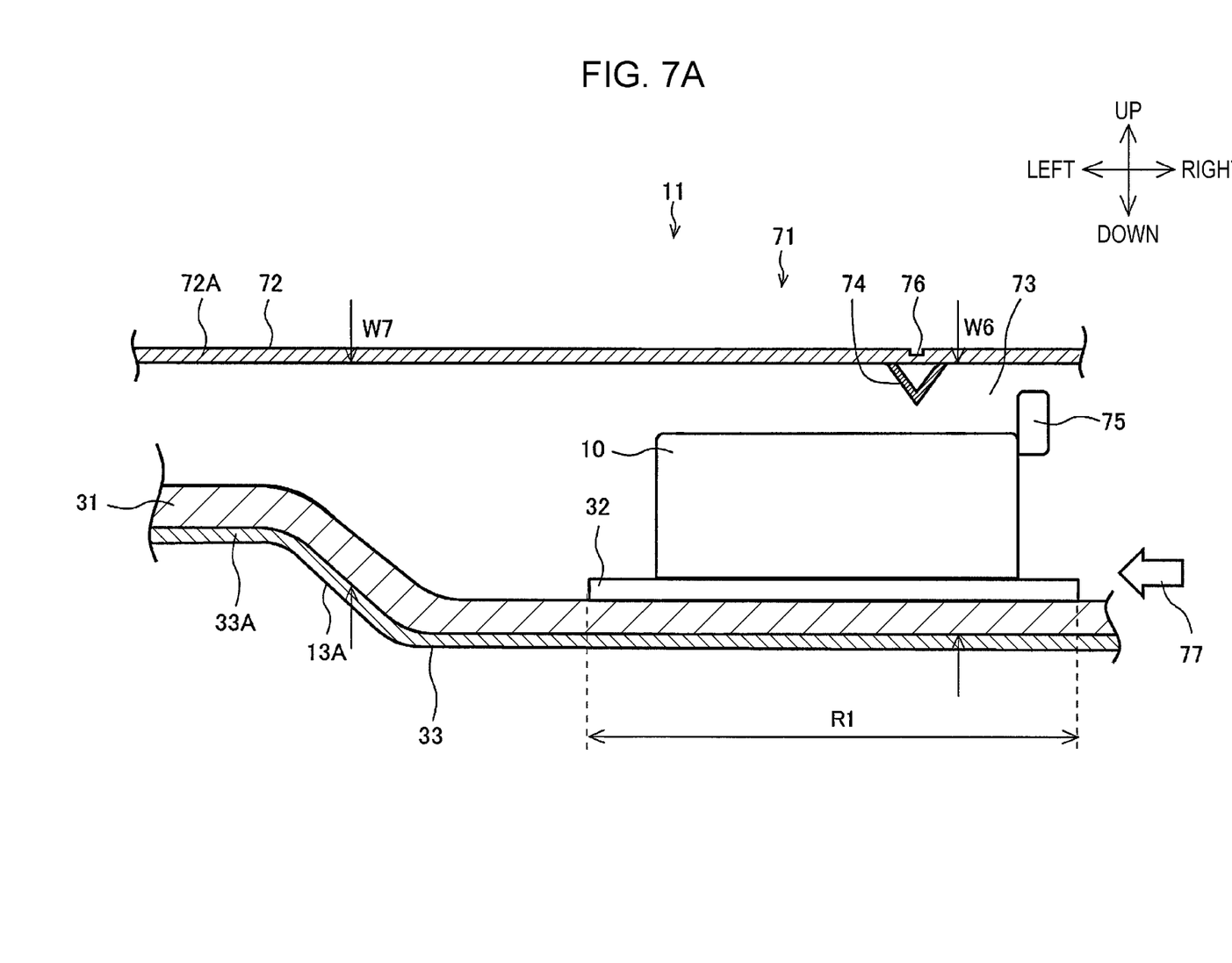
FIG. 7A is a cross-sectional view illustrating a second modification of the battery-module protection structure according to the embodiment of the disclosure.
Figure 7B:
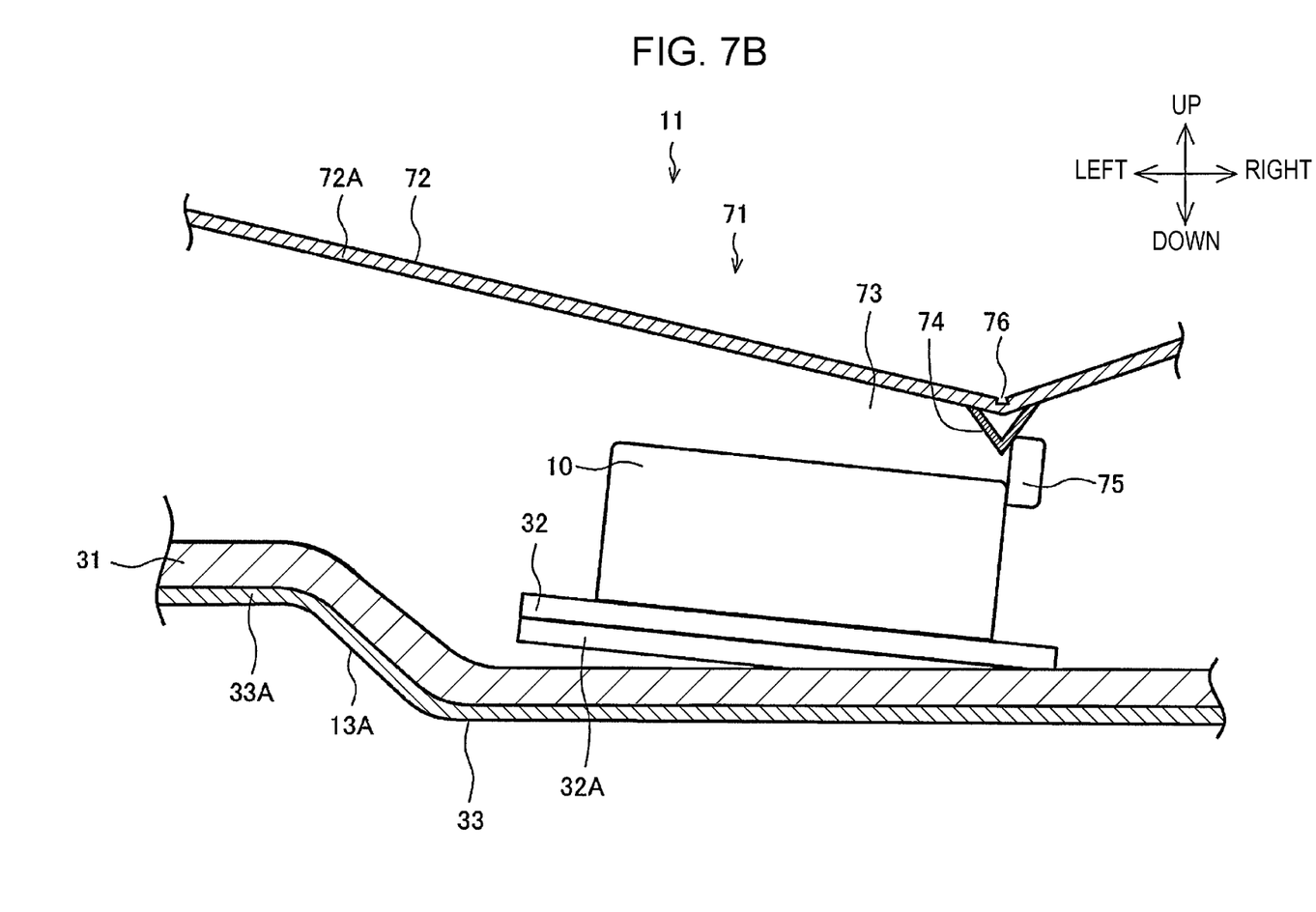
FIG. 7B is a cross-sectional view illustrating the second modification of the battery-module protection structure according to the embodiment of the disclosure.

Next, first and second modifications of the protection structure 11 for the battery module 10 according to this embodiment will be described in detail with reference to FIG. 6A to FIG. 7B. FIG. 6A is a cross-sectional view illustrating the protection structure 11 for the battery module 10 before the vehicle 12 according to this embodiment receives an external impact. FIG. 6B is a cross-sectional view illustrating the protection structure 11 for the battery module 10 after the vehicle 12 according to this embodiment receives an external impact. FIG. 7A is a cross-sectional view illustrating the protection structure 11 for the battery module 10 according to this embodiment. FIG. 7B is a cross-sectional view illustrating the protection structure 11 for the battery module 10 after the vehicle 12 according to this embodiment receives an external impact.

In the following description, same reference signs will be used for components identical to those in the protection structure 11 for the battery module 10 described with reference to FIG. 1 to FIG. 5, and redundant descriptions will be omitted. Although the following description relates to a case where an external impact is applied due to a lateral collision from the right side of the vehicle 12, the same applies to a case where an external impact is applied due to a lateral collision from the left side of the vehicle 12, and a description of such a case will thus be omitted.

First, the first modification of the protection structure 11 for the battery module 10 will be described with reference to FIG. 6A and FIG. 6B.

As illustrated in FIG. 6A, with regard to a cross member 61, the lower cross member 33 and an upper cross member 62 are joined to each other by welding. The cross member 61 is a hollow structure having a cavity 63. The rail 31 extends in the vehicle-width direction of the vehicle 12 and is secured on the bottom plate 33A of the lower cross member 33. The pedestal 32 is secured to the rail 31 and supports the battery module 10 in a secured state on the upper surface thereof.

As illustrated in FIG. 6A, a top plate 62A of the upper cross member 62 extends in a substantially horizontal state. With regard to the width of the cavity 63 in the height direction of the vehicle 12, a width W5 at the bent segment 13A of the lower cross member 33 is smaller than a width W4 at the securing region R1 of the pedestal 32. In the securing region R1 of the pedestal 32, a sufficient space is ensured above the battery module 10.

As illustrated in FIG. 6A, a guide wall 64 located away from the corresponding end plate of the battery module 10 is provided near an end of the pedestal 32 toward the center of the vehicle 12. The guide wall 64 extends diagonally upward toward the center of the vehicle 12 and has a width substantially equal to that of the pedestal 32 in the breadth direction thereof (i.e., the front-rear direction in the drawing). The distal end of the guide wall 64 extends to a position higher than the battery module 10 secured to the upper surface of the pedestal 32. Although not illustrated, the protection walls 22 may be provided near the ends of the pedestal 32 at the outer sides of the vehicle cabin.

FIG. 6A illustrates a state where a large external impact is not applied to the pedestal 32 during the normal traveling mode of the vehicle 12. In this state, even if vibrations occurring during the traveling of the vehicle 12 are applied to the pedestal 32, the pedestal 32 is maintained in the secured state on the upper surface of the rail 31 by using the bolts 43 (see FIG. 3A). In the cavity 63, a sufficient space is ensured between the battery module 10 and the cross member 61. With this structure, the battery module 10 is prevented from colliding with the cross member 61 due to the aforementioned vibrations, so that the battery cells are prevented from being damaged. Furthermore, the battery module 10 is maintained in the secured state on the upper surface of the pedestal 32, so that the battery cells are prevented from being deformed and damaged as a result of colliding with each other due to the aforementioned vibrations.

As illustrated in FIG. 6B, when the vehicle 12 is involved in a lateral collision and the side sill 18 (see FIG. 1) becomes deformed toward the interior (in an inner direction) of the vehicle 12, the side sill 18 collides with the corresponding end of the pedestal 32 or the corresponding protection wall 22, so that an external impact indicated by an arrow 65 (see FIG. 6A) is applied to the pedestal 32. Then, the external impact is applied to the four bolts 43 (see FIG. 3A) via the pedestal 32. If the external impact is greater than the design strength of the bolts 43, the four bolts 43 break, as mentioned above. As a result, the pedestal 32 detaches from the rail 31, and the pedestal 32 moves toward the interior (in an inner direction) of the vehicle 12 via the rail 31.

As illustrated in FIG. 6B, the pedestal 32 moves toward the center of the vehicle 12 and collides with the rail 31 at the bent segment 13A of the lower cross member 33. Then, the pedestal 32 and the guide wall 64 are lifted upward via a slope of the rail 31. As a result, the distal end of the guide wall 64 collides with the top plate 62A of the cross member 61 before the battery module 10 collides therewith.

In this case, the cross member 61 also receives an external force in the compressing direction (i.e., the left-right direction in the drawing) due to the external impact, and the top plate 62A undergoes a collision with the guide wall 64 from the direction of the cavity 63. Then, the cross member 61 becomes deformed into an inverted V-shape centered on the collision region between the guide wall 64 and the top plate 62A. As a result of the cross member 61 undergoing the inverted-V-shaped deformation, the width W5 of the cavity 63 above the bent segment 13A of the lower cross member 33 increases, so that the battery module 10 is less likely to collide with the cross member 61.

With this structure, when the pedestal 32 moves toward the interior (in an inner direction) of the vehicle 12 while being guided by the rail 31, the battery module 10 is prevented from colliding with the top plate 62A, the front plate (not illustrated), and the rear plate 33B of the cross member 61. Moreover, the battery cells in the battery module 10 are prevented from being deformed and damaged.

Next, the second modification of the protection structure 11 for the battery module 10 will be described with reference to FIG. 7A and FIG. 7B.

As illustrated in FIG. 7A, with regard to a cross member 71, the lower cross member 33 and an upper cross member 72 are joined to each other by welding. The cross member 71 is a hollow structure having a cavity 73. The rail 31 extends in the vehicle-width direction of the vehicle 12 and is secured on the bottom plate 33A of the lower cross member 33. The pedestal 32 is secured to the rail 31 and supports the battery module 10 in a secured state on the upper surface thereof.

As illustrated in FIG. 7A, a top plate 72A of the upper cross member 72 extends in a substantially horizontal state. With regard to the width of the cavity 73 in the height direction of the vehicle 12, a width W7 at the bent segment 13A of the lower cross member 33 is smaller than a width W6 at the securing region R1 of the pedestal 32. In the securing region R1 of the pedestal 32, a sufficient space is ensured above the battery module 10.

In the securing region R1 of the pedestal 32, the top plate 72A is provided with a protrusion 74 by utilizing the cavity 73 above the battery module 10. The protrusion 74 is provided without being in contact with the upper surface of the battery module 10 and extends in the front-rear direction of the vehicle 12. The region where the top plate 72A is provided with the protrusion 74 has a recessed bead 76 extending in the front-rear direction of the vehicle 12.

An engagement bracket 75 extends in the front-rear direction of the vehicle 12 at the end of the battery module 10 at the outer side of the vehicle cabin. The engagement bracket 75 is located at the outer side of the vehicle cabin relative to the protrusion 74, and protrudes upward to a position higher than the upper surface of the battery module 10. Although not illustrated, the protection walls 22 may be provided near the ends of the pedestal 32 at the outer sides of the vehicle cabin.

FIG. 7A illustrates a state where a large external impact is not applied to the pedestal 32 during the normal traveling mode of the vehicle 12. In this state, even if vibrations occurring during the traveling of the vehicle 12 are applied to the pedestal 32, the pedestal 32 is maintained in the secured state on the upper surface of the rail 31 by using the bolts 43 (see FIG. 3A). In the cavity 73, a sufficient space is ensured between the battery module 10 and the cross member 71 without the battery module 10 being in contact with the protrusion 74.

With this structure, the battery module 10 is prevented from colliding with the cross member 71 due to the aforementioned vibrations, so that the battery cells are prevented from being damaged. Furthermore, the battery module 10 is maintained in the secured state on the upper surface of the pedestal 32, so that the battery cells are prevented from being deformed and damaged as a result of colliding with each other due to the aforementioned vibrations.

As illustrated in FIG. 7B, when the vehicle 12 is involved in a lateral collision and the side sill 18 (see FIG. 1) becomes deformed toward the interior (in an inner direction) of the vehicle 12, the side sill 18 collides with the corresponding end of the pedestal 32 or the corresponding protection wall 22, so that an external impact indicated by an arrow 77 (see FIG. 7A) is applied to the pedestal 32. Then, the external impact is applied to the four bolts 43 (see FIG. 3A) via the pedestal 32. If the external impact is greater than the design strength of the bolts 43, the four bolts 43 break, as mentioned above. As a result, the pedestal 32 detaches from the rail 31, and the pedestal 32 moves toward the interior (in an inner direction) of the vehicle 12 via the rail 31.

In this case, the cross member 71 also receives an external force in the compressing direction (i.e., the left-right direction in the drawing) due to the external impact. As mentioned above, the top plate 72A has the bead 76, so that the cross member 71 becomes deformed into a V-shape centered on the bead 76. As a result of the cross member 71 undergoing the V-shaped deformation, the protrusion 74 approaches the upper surface of the battery module 10.

As a result, when the pedestal 32 moves toward the interior (in an inner direction) of the vehicle 12 via the rail 31, the engagement bracket 75 engages with the protrusion 74. The engagement between the engagement bracket 75 and the protrusion 74 inhibits movement of the pedestal 32 toward the interior (in an inner direction) of the vehicle 12. As a result of a sudden stoppage of the pedestal 32, the leading end of the pedestal 32 in the traveling direction thereof is lifted upward.

As illustrated in FIG. 7B, the cross member 71 undergoes the V-shaped deformation centered on the bead 76, so that the width of the cavity 73 increases toward the bent segment 13A of the lower cross member 33. The battery module 10 is then lifted upward toward the widened space via the pedestal 32, so that the battery module 10 is less likely to collide with the cross member 71.

With this structure, when the pedestal 32 moves toward the interior (in an inner direction) of the vehicle 12 while being guided by the rail 31, the battery module 10 is prevented from colliding with the top plate 72A, the front plate (not illustrated), and the rear plate 33B of the cross member 71. Moreover, the battery cells in the battery module 10 are prevented from being deformed and damaged.

The battery-module protection structure according to the embodiment of the disclosure has the battery module accommodated within the vehicle frame, and the pedestal on which the battery module is secured is secured to the rail disposed within the vehicle frame. With this structure, when the vehicle is involved in a lateral collision and receives a large external impact, the pedestal detaches from the rail together with the battery module and moves toward the interior (in an inner direction) of the vehicle, so that the battery module is less likely to be damaged.

The invention claimed is:

1. A battery-module protection structure configured to protect a battery module accommodated within a vehicle frame of a vehicle from an external impact, the battery-module protection structure comprising:
   a rail disposed within the vehicle frame;
   a pedestal securing the battery module and secured to the rail by using a securing member; and
   the vehicle frame configured as a housing of the battery module, wherein
   the pedestal is configured such that, in a case where the vehicle receives the external impact and the securing member breaks, the pedestal moves in an inner direction of the vehicle along the rail while securing the battery module.

2. The battery-module protection structure according to claim 1, wherein
   the pedestal comprises a first portion located at an outer side of a vehicle cabin of the vehicle in an extending direction of the rail,
   the first portion comprises a protection wall disposed at a position located away from the battery module, and
   the protection wall is configured to collide with a vehicle body of the vehicle that has deformed due to the external impact.

3. The battery-module protection structure according to claim 1, wherein
   the vehicle frame comprises a bent segment extending in a vehicle-width direction of the vehicle and bent upward in a region including a center in the vehicle-width direction, and
   a cavity in the vehicle frame is wider in a region where the bent segment is provided than in a securing region of the pedestal.

4. The battery-module protection structure according to claim 2, wherein
   the vehicle frame comprises a bent segment extending in a vehicle-width direction of the vehicle and bent upward in a region including a center in the vehicle-width direction, and
   a cavity in the vehicle frame is wider in a region where the bent segment is provided than in a securing region of the pedestal.

5. The battery-module protection structure according to claim 3, wherein
   the pedestal comprises a second portion located at a center side of the vehicle in an extending direction of the rail,
   the second portion comprises a guide wall disposed at a position located away from the battery module,
   the guide wall extends to a position higher than the battery module, and
   the guide wall is configured such that, in a case where the pedestal moves, the guide wall comes into contact with a top plate of the vehicle frame above the bent segment and an area surrounding the bent segment to widen the cavity at the bent segment.

6. The battery-module protection structure according to claim 4, wherein
   the pedestal comprises a second portion located at a center side of the vehicle in the extending direction of the rail,
   the second portion comprises a guide wall disposed at a position located away from the battery module,
   the guide wall extends to a position higher than the battery module, and
   the guide wall is configured such that, in a case where the pedestal moves, the guide wall comes into contact with a top plate of the vehicle frame above the bent segment and an area surrounding the bent segment to widen the cavity at the bent segment.

7. The battery-module protection structure according to claim 3, wherein
   the vehicle frame is disposed at an upper surface of a floor panel of the vehicle,
   the floor panel has a tunnel at the region including the center of the vehicle, and
   a reinforcement member configured to support the floor panel is disposed below the tunnel in the floor panel.

8. The battery-module protection structure according to claim 4, wherein
   the vehicle frame is disposed at an upper surface of a floor panel of the vehicle,
   the floor panel has a tunnel at the region including the center of the vehicle, and
   a reinforcement member configured to support the floor panel is disposed below the tunnel in the floor panel.

9. The battery-module protection structure according to claim 5, wherein
   the vehicle frame is disposed at an upper surface of a floor panel of the vehicle,
   the floor panel has a tunnel at the region including the center of the vehicle, and
   a reinforcement member configured to support the floor panel is disposed below the tunnel in the floor panel.

10. The battery-module protection structure according to claim 6, wherein
    the vehicle frame is disposed at an upper surface of a floor panel of the vehicle,
    the floor panel has a tunnel at the region including the center of the vehicle, and
    a reinforcement member configured to support the floor panel is disposed below the tunnel in the floor panel.

* * * * *